March 9, 1926.
D. McC. WHITE
1,575,883
AUTOMOBILE CONSTRUCTION
Filed June 16, 1923
2 Sheets-Sheet 1
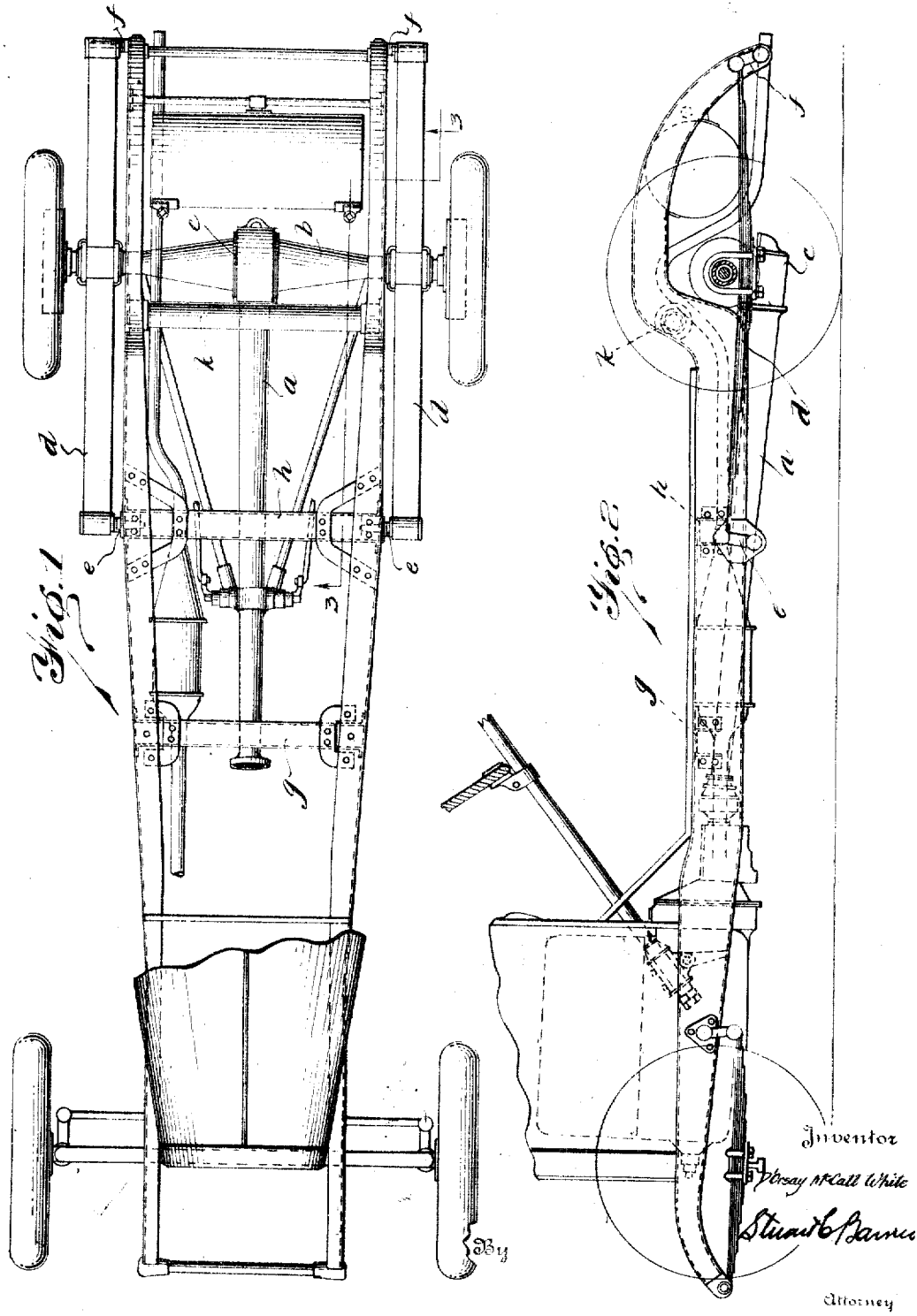

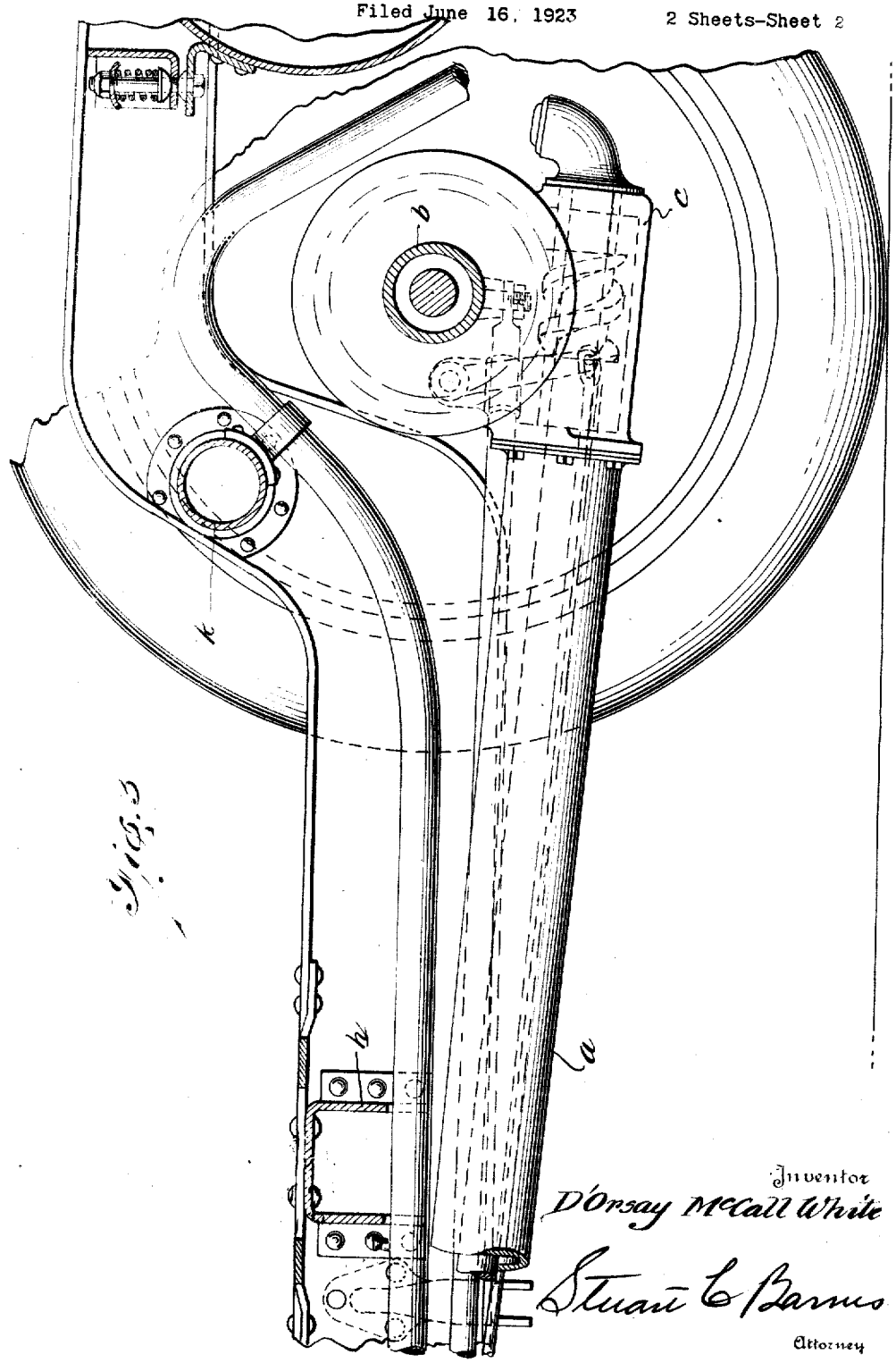

Patented Mar. 9, 1926.

1,575,883

UNITED STATES PATENT OFFICE.

D'ORSAY McCALL WHITE, OF DETROIT, MICHIGAN.

AUTOMOBILE CONSTRUCTION.

Application filed June 16, 1923. Serial No. 645,780.

*To all whom it may concern:*

Be it known that I, D'ORSAY McCALL WHITE, a subject of Great Britain, residing at Detroit, in the county of Wayne and State of Michigan, have invented certain new and useful Improvements in Automobile Constructions, of which the following is a specification.

This invention relates to automobiles and has for its object a special form of chassis frame construction combined with a worm or spiral gear drive which is under-slung on the rear axle. This permits of a deeper drop frame and secures a chassis frame the main portion of which is nearer to the ground than can be otherwise attained with the ordinary chassis frame and axle and torque tube construction.

A further feature of the construction is an improved bracing effect secured at the point where the bend is made in the chassis frame by means of a cross running tube in place of the usual channel construction. These and other features will be described in detail in a description following the enumeration of the figures.

Fig. 1 is a plan view of the chassis frame and the drive.

Fig. 2 is a side elevation showing the same parts some of them in dotted line.

Fig. 3 is a large longitudinal section of the rear part of the same on the line 3—3 of Fig. 1.

The automobile construction here shown is intended to be one belonging to the high grade class which combines not only strength, but quality features, not found in the ordinary run of cars. The chassis frame is made up of pressed steel heavy section channel bars such as shown in the drawing. These channel bars are pressed with a relatively deep drop in the frame—a very much deeper drop than is customary with the ordinary chassis frame construction. In fact the lower side of the channel bar clears the ground by only 13 inches and the running board is only 12 inches above the ground. The floor of the car is only about 20 inches above the ground. This makes a very low hung car which is most desirable in providing ease in climbing in and out of the car and also in having the weight of the car hung low so that the car will keep the road better at high speed.

These low side bars of the chassis frame are made possible by reason of the underslung torque tube or propeller shaft tube; this is designated $a$ and it will be seen that the rear axle housing is provided with an underslung integral gear or worm housing $c$ to which the rear end of the propeller shaft tube is secured. The ordinary beveled gear drive meets the rear axle housing at the center of the front and the ordinary worm gear drive meets the rear axle housing above the same. By underslinging the propeller shaft and using a worm and worm gear, the torque tube, the universal joint, the transmission, and the engine, can be hung at a very much lower level with respect to the axle and wheels than has heretofore been possible. Hence a very much deeper drop frame can be employed. It will, however, be necessary to kick up the rear of the chassis frame the ordinary distance above the axle so as to give the rear axle the usual free space in which to move in response to the irregularities in the road. The spring preferably used is a long relatively flat leaf spring $d$. By reason of the unusually low frame, the shackles $e$ and $f$ at both ends extend from the eyes at the ends of the spring downward and are pivoted on bolts bracketed to the chassis frame.

It will be seen that with the arrangement of the parts described that this low chassis frame construction is secured without having to kick up the cross channels $g$ and $h$ in order to clear the drive. Obviously if these cross channels had to be kicked up in order to clear the torque tube, then the lower chassis frame would be of no advantage as the floor of the car could not very well be lowered on account of kicking up the cross channels.

In order to more thoroughly strengthen the chassis frame where the unusually deep drop occurs, I employ in place of the usual cross channel, an end flanged tube $k$ which obviously has more strength in the direction of forces than the cross channel. This makes the frame an unusually strong one.

It is inadvisable of course in the claims to specify the amount of drop in measurement of inches. It will be apparent, however, that the drop in the chassis frame is quite a little below the center of the rear axle and that this forms a simple criterion for specifying the new and novel arrangement; for an ordinary chassis frame and axle construction the side bars of the chassis frame are considerably higher than the center of the rear axle.

What I claim is:

1. In an automobile, the combination of a pair of front wheels and front axle, a pair of rear driving wheels and driving axle and axle housing, a chassis provided with one or more cross bars and a frame kick up at the rear over the rear axle housing to give the usual necessary clearance and having a relatively deep drop just forward of the rear axle housing so that the dropped portion of the chassis frame has its lower side below the center of the rear axle when the same is in its normal position, springs for suspending the chassis frame on the front axle and on the rear axle housing, a motor supported immediately behind the front axle on the chassis frame and largely above the chassis frame, supported below said cross bar or bars and a propeller shaft supported below said cross bar, or bars, and connecting the said motor with the rear axle housing, and under-slung where it connects with the rear axle housing thereby permitting the lowering of the chassis frame, said propeller shaft having a driving connection with the rear axle on the under side thereof.

2. In an automobile, the combination of a pair of front wheels and a front axle, a pair of rear driving wheels, a rear axle housing provided with a worm gear and driving shafts, a chassis frame provided with one or more cross bars and kicked up over the rear axle to give the usual necessary clearance due to the axle movements and spring flexure, the said chassis frame having a relatively deep drop immediately in front of the axle and the said drop portion of the chassis frame located at the level of the rear axle with the lower portions of the chassis frame below the center of the rear axle, springs for supporting the chassis frame on the front axle and the rear axle housing, an engine supported on the front of the chassis frame immediately at the rear of the front axle and largely above the chassis frame, a propeller shaft under said crossbar, or bars, and connecting the engine with the rear axle housing and under-slung on the latter, thereby making possible the lowering of the chassis frame, said propeller shaft being provided at its rear end with a worm having a driving relation with the said worm gear on the under side thereof.

In testimony whereof I affix my signature.

D'ORSAY McCALL WHITE.

struction the side bars of the chassis frame are considerably higher than the center of the rear axle.

What I claim is:

1. In an automobile, the combination of a pair of front wheels and front axle, a pair of rear driving wheels and driving axle and axle housing, a chassis provided with one or more cross bars and a frame kick up at the rear over the rear axle housing to give the usual necessary clearance and having a relatively deep drop just forward of the rear axle housing so that the dropped portion of the chassis frame has its lower side below the center of the rear axle when the same is in its normal position, springs for suspending the chassis frame on the front axle and on the rear axle housing, a motor supported immediately behind the front axle on the chassis frame and largely above the chassis frame, supported below said cross bar or bars and a propeller shaft supported below said cross bar, or bars, and connecting the said motor with the rear axle housing, and under-slung where it connects with the rear axle housing thereby permitting the lowering of the chassis frame, said propeller shaft having a driving connection with the rear axle on the under side thereof.

2. In an automobile, the combination of a pair of front wheels and a front axle, a pair of rear driving wheels, a rear axle housing provided with a worm gear and driving shafts, a chassis frame provided with one or more cross bars and kicked up over the rear axle to give the usual necessary clearance due to the axle movements and spring flexure, the said chassis frame having a relatively deep drop immediately in front of the axle and the said drop portion of the chassis frame located at the level of the rear axle with the lower portions of the chassis frame below the center of the rear axle, springs for supporting the chassis frame on the front axle and the rear axle housing, an engine supported on the front of the chassis frame immediately at the rear of the front axle and largely above the chassis frame, a propeller shaft under said crossbar, or bars, and connecting the engine with the rear axle housing and under-slung on the latter, thereby making possible the lowering of the chassis frame, said propeller shaft being provided at its rear end with a worm having a driving relation with the said worm gear on the under side thereof.

In testimony whereof I affix my signature.

D'ORSAY McCALL WHITE.

Certificate of Correction.

It is hereby certified that in Letters Patent No. 1,575,883, granted March 9, 1926, upon the application of D'Orsay McCall White, of Detroit, Michigan, for an improvement in "Automobile Constructions," errors appear in the printed specification requiring correction as follows: Page 2, line , claim 1, for the word "kick" read kicked, and lines 21 and 22, same claim, strike out the words "supported below said cross bar or bars and"; and that the said Letters Patent should be read with these corrections therein that the same may conform to the record of the case in the Patent Office.

Signed and sealed this 20th day of April, A. D. 1926.

[SEAL.]

M. J. MOORE,
Acting Commissioner of Patents.

Certificate of Correction.

It is hereby certified that in Letters Patent No. 1,575,883, granted March 9, 1926, upon the application of D'Orsay McCall White, of Detroit, Michigan, for an improvement in "Automobile Constructions," errors appear in the printed specification requiring correction as follows: Page 2, line , claim 1, for the word "kick" read *kicked*, and lines 21 and 22, same claim, strike out the words " supported below said cross-bar or bars and "; and that the said Letters Patent should be read with these corrections therein that the same may conform to the record of the case in the Patent Office.

Signed and sealed this 20th day of April, A. D. 1926.

[SEAL.]
M. J. MOORE,
*Acting Commissioner of Patents.*